(12) United States Patent
Liu et al.

(10) Patent No.: US 10,469,172 B2
(45) Date of Patent: Nov. 5, 2019

(54) CHANNEL RECOVERY IN BURST-MODE, TIME-DIVISION MULTIPLEXING (TDM) PASSIVE OPTICAL NETWORKS (PONS)

(71) Applicant: Futurewei Technologies, Inc., Plano, TX (US)

(72) Inventors: Xiang Liu, Marlboro, NJ (US); Frank Effenberger, Frisco, TX (US); Huaiyu Zeng, Red Bank, NJ (US); Shuchang Yao, Wuhan (CN); Lei Zhou, Shenzhen (CN); Xianbo Dai, Chengdu (CN); Shengming Ma, Chengdu (CN); Lin Huang, Chengdu (CN)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 16/179,606

(22) Filed: Nov. 2, 2018

(65) Prior Publication Data
US 2019/0074905 A1    Mar. 7, 2019

Related U.S. Application Data

(62) Division of application No. 15/477,754, filed on Apr. 3, 2017, now Pat. No. 10,153,844.

(51) Int. Cl.
*H04B 10/00* (2013.01)
*H04B 10/40* (2013.01)
(Continued)

(52) U.S. Cl.
CPC ........... *H04B 10/40* (2013.01); *H04B 10/272* (2013.01); *H04B 10/6971* (2013.01);
(Continued)

(58) Field of Classification Search
CPC combination set(s) only.
See application file for complete search history.

(56) References Cited

U.S. PATENT DOCUMENTS

| 4,866,739 A | 9/1989 | Agazzi et al. |
| 6,567,484 B1 | 5/2003 | Hirota et al. |
| (Continued) | | |

FOREIGN PATENT DOCUMENTS

| CN | 1825794 A | 8/2006 |
| CN | 101604998 A | 12/2009 |
| (Continued) | | |

OTHER PUBLICATIONS

Office Action dated Apr. 1, 2019, 26 pages, U.S. Appl. No. 15/916,060, filed Mar. 8, 2018.
(Continued)

*Primary Examiner* — Agustin Bello
(74) *Attorney, Agent, or Firm* — Conley Rose, P.C.

(57) ABSTRACT

A transceiver comprises: a sampling phase optimization stage comprising: a first interpolator; a first equalizer coupled to the first interpolator; a first optimizer coupled to the first equalizer; and an output; and an equalization stage coupled to the output and comprising: a buffer; a second interpolator coupled to the buffer; and a second equalizer coupled to the second interpolator. A method comprising: receiving an optical burst signal; determining an optimum sampling phase based on a portion of a digital signal representing the optical burst signal; and equalizing all of the digital signal using the optimum sampling phase.

20 Claims, 9 Drawing Sheets

(51) Int. Cl.
  *H04L 1/00* (2006.01)
  *H04L 25/03* (2006.01)
  *H04B 10/272* (2013.01)
  *H04B 10/69* (2013.01)
  *H04J 14/08* (2006.01)

(52) U.S. Cl.
  CPC ............ *H04J 14/08* (2013.01); *H04L 1/0045* (2013.01); *H04L 25/03* (2013.01)

(56) References Cited

U.S. PATENT DOCUMENTS

| | | | |
|---|---|---|---|
| 7,738,602 B2 | 6/2010 | Langenbach et al. | |
| 7,961,781 B2 | 6/2011 | Telang et al. | |
| 8,068,572 B2 | 11/2011 | Langenbach et al. | |
| 8,873,973 B2 | 10/2014 | Komaki et al. | |
| 9,432,755 B2 | 8/2016 | Luo et al. | |
| 10,038,505 B2 * | 7/2018 | Fan | H04B 10/40 |
| 10,153,844 B2 * | 12/2018 | Liu | H04L 25/03 |
| 2002/0027689 A1 | 3/2002 | Bartur et al. | |
| 2004/0052213 A1 | 3/2004 | Cankaya et al. | |
| 2004/0166817 A1 | 8/2004 | Mokhtari et al. | |
| 2006/0188046 A1 | 8/2006 | Jain | |
| 2007/0196111 A1 | 8/2007 | Shang | |
| 2007/0263673 A1 * | 11/2007 | Agazzi | H03M 1/0624 370/516 |
| 2007/0291886 A1 | 12/2007 | Langenbach et al. | |
| 2008/0049847 A1 | 2/2008 | Telang et al. | |
| 2008/0080657 A1 | 4/2008 | Aziz et al. | |
| 2010/0074346 A1 | 3/2010 | Thompson et al. | |
| 2010/0316387 A1 | 12/2010 | Suvakovic | |
| 2011/0008055 A1 | 1/2011 | Effenberger | |
| 2011/0200339 A1 | 8/2011 | Komaki et al. | |
| 2011/0255866 A1 | 10/2011 | Van Veen et al. | |
| 2012/0128377 A1 | 5/2012 | Hatae et al. | |
| 2013/0062508 A1 | 3/2013 | Kanter et al. | |
| 2014/0029958 A1 | 1/2014 | Takahashi et al. | |
| 2014/0147130 A1 | 5/2014 | Poulsen et al. | |
| 2014/0286381 A1 * | 9/2014 | Shibasaki | H03L 7/089 375/226 |
| 2014/0328602 A1 * | 11/2014 | Sakamoto | H04B 10/6161 398/208 |
| 2015/0180588 A1 | 6/2015 | Marsella et al. | |
| 2016/0344540 A1 * | 11/2016 | Derras | H04L 7/048 |
| 2016/0373212 A1 | 12/2016 | Ling et al. | |
| 2017/0019203 A1 | 1/2017 | Asm et al. | |
| 2018/0287706 A1 * | 10/2018 | Liu | H04L 25/03 |
| 2019/0074905 A1 * | 3/2019 | Liu | H04L 25/03 |
| 2019/0109646 A1 * | 4/2019 | Agazzi | H04B 10/40 |

FOREIGN PATENT DOCUMENTS

| | | |
|---|---|---|
| CN | 102204196 A | 9/2011 |
| CN | 102884735 A | 1/2013 |

OTHER PUBLICATIONS

Machine Translation and Abstract of Chinese Publication No. CN101604998, dated Dec. 16, 2009, 12 pages.
Machine Translation and Abstract of Chinese Publication No. CN102884735, dated Jan. 16, 2013, 26 pages.
Nakagawa, J., et al., "10.3-Gb/s Burst-Mode 3R Receiver Incorporating Full AGC Optical Receiver and 82.5-GS/s Over-Sampling CDR for 10G-EPON Systems," IEEE Photonics Technology Letters, vol. 22, No. 7, Apr. 1, 2010, pp. 471-473.
Reichmann, K.C., et al.,"A Symmetric-Rate, Extended-Reach 40Gb/s CWDM-TDMA Pon with Downstream and Upstream SOA-Raman Amplification," Journal of Lightwave Technology, vol. 30, No. 4, Feb. 15, 2012, 8 pages.
"Linear interpolation," Wikipedia, Feb. 2, 2017, 4 pages.
Van Praet, et al., "Demonstration of Low-Power Bit-Interleaving TDM PON," Optical Society of America, vol. 20, No. 26 / Optics Express, Dec. 10, 2012, pp. B7-B14.
Wong, S., et al, "Sleep Mode for Energy Saving PONs: Advantages and Drawbacks," 2009 IEEE Globecom Workshops, Dec. 28, 2009, 6 pages.
Foreign Communication From A Counterpart Application, PCT Application No. PCT/CN2018/079163, English Translation of International Search Report dated May 30, 2018, 5 pages.
Foreign Communication From A Counterpart Application, PCT Application No. PCT/CN2018/079163, English Translation of Written Opinion dated May 30, 2018, 4 pages.
Foreign Communication From A Counterpart Application, PCT Application No. PCT/CN2018/081001, English Translation of International Search Report dated Jun. 21, 2018, 5 pages.
Foreign Communication From A Counterpart Application, PCT Application No. PCT/CN2018/081001, English Translation of Written Opinion dated Jun. 21, 2018, 5 pages.
Office Action dated Jan. 11, 2018, 10 pages, U.S. Appl. No. 15/477,754, filed Apr. 3, 2017.
Office Action dated Feb. 23, 2018, 11 pages, U.S. Appl. No. 15/477,754, filed Apr. 3, 2017.
Notice of Allowance dated Aug. 13, 2018, 12 pages, U.S. Appl. No. 15/477,754, filed Apr. 3, 2017.

* cited by examiner

CHANNEL RECOVERY IN BURST-MODE, TIME-DIVISION MULTIPLEXING (TDM) PASSIVE OPTICAL NETWORKS (PONS)

CROSS-REFERENCE TO RELATED APPLICATIONS

This application is a divisional application of U.S. patent application Ser. No. 15/477,754 filed on Apr. 3, 2017 by Futurewei Technologies, Inc. and titled "Channel Recovery in Burst-Mode, Time-Division Multiplexing (TDM) Passive Optical Networks (PONs)," which is incorporated by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A PON is one system for providing network access over the last mile, which is the final portion of a telecommunications network that delivers communication to customers. A PON is a P2MP network comprising an OLT at a CO, ONUs at the user premises, and an ODN coupling the OLT to the ONUs. PONs may also comprise RNs located between the OLTs and the ONUs, for instance at the end of roads where multiple customers reside.

NG-PONs may combine TDM and WDM to support higher capacities so that increased numbers of users can be served by a single OLT with sufficient bandwidth per user. In such a TWDM PON, a WDM PON may be overlaid on top of a TDM PON. In other words, different wavelengths may be multiplexed together to share a single feeder fiber, and each wavelength may be shared by multiple users using TDM.

SUMMARY

According to various embodiments of the disclosure, embodiments for channel recovery in burst-mode TDM PONs are disclosed. The embodiments implement two stages. A first stage, or sampling phase optimization stage, determines an optimum sampling phase using settings determined from a previous burst signal from a same ONU or using default settings. The sampling phase optimization stage implements interpolation, equalization, and phase determination based on an error. The error may be either a minimum MSE or a maximum MSE with a T/2 or −T/2 phase shift, where T is a sampling period. A second stage, or equalization stage, implements adaptive equalization using the optimum sampling phase. The embodiments may use ADC processing at two times a symbol rate for simplicity. The embodiments are fast reacting because they provide channel recovery times of less than 100 ns, which is less than channel recovery times of about 1 μs for existing burst-mode reception approaches. The embodiments also provide performance comparable to that of continuous-mode reception approaches. Because of that speed, the embodiments may apply to TDM PONs operating at 25 Gb/s and above. Furthermore, the embodiments allow for the use of low-cost, narrow-bandwidth optical components because of the channel equalization capability.

In one embodiment, the disclosure includes a transceiver comprising: a sampling phase optimization stage comprising: a first interpolator; a first equalizer coupled to the first interpolator; a first optimizer coupled to the first equalizer; and an output; and an equalization stage coupled to the output and comprising: a buffer; a second interpolator coupled to the buffer; and a second equalizer coupled to the second interpolator. In some embodiments, the equalization stage further comprises: a demodulator coupled to the second equalizer; and an FEC decoder coupled to the demodulator; the transceiver further comprises: a MAC coupled to the sampling phase optimization stage and the equalization stage; the transceiver further comprises: a PD; a TIA coupled to the PD; and an ADC coupled to the TIA, the sampling phase optimization stage, and the equalization stage; the transceiver further comprises: a VCO coupled to the ADC; and a transmitter coupled to the VCO; the sampling phase optimization stage further comprises: a third interpolator coupled to the first optimizer; a third equalizer coupled to the third interpolator; and a third optimizer coupled to the third equalizer and the output.

In another embodiment, the disclosure includes a transceiver comprising: a PD configured to receive an optical burst signal; a sampling phase optimization stage configured to determine an optimum sampling phase based on a portion of a digital signal representing the optical burst signal; and an equalization stage configured to equalize all of the digital signal using the optimum sampling phase. In some embodiments, the sampling phase optimization stage is further configured to further determine the optimum sampling phase by: performing an interpolation using a T/N resolution to produce waveforms with different phases, wherein T is a sampling period, and wherein N is an integer greater than 3; equalizing the waveforms using pre-stored coefficients to produce equalized waveforms; determining MSEs for the equalized waveforms; determining a first equalized waveform with a smallest MSE; and determining that the optimum sampling phase is a phase of the first equalized waveform; the sampling phase optimization stage is further configured to further determine the optimum sampling phase by: performing an interpolation using a T/N resolution to produce waveforms with different phases, wherein T is a sampling period, and wherein N is an integer greater than 3; equalizing the waveforms using pre-stored coefficients to produce equalized waveforms; determining MSEs for the equalized waveforms; determining a first equalized waveform with a largest MSE; and determining that the optimum sampling phase is a phase of the first equalized waveform shifted by T/2 or −T/2; the sampling phase optimization stage is further configured to further determine the optimum sampling phase by: performing coarse phase optimization using a T/4 resolution, wherein T is a sampling period; and performing fine phase optimization using a T/32 resolution; the sampling phase optimization stage is further configured to further determine the optimum sampling phase based on a smallest MSE; the sampling phase optimization stage is further configured to further determine the optimum sampling phase based on a largest MSE and a T/2 or −T/2 shift; the equalization stage is further configured to further equalize all of the digital signal by buffering the digital signal while the sampling phase optimization stage determines the optimum sampling phase; the equalization stage is further configured to further equalize all of the digital signal by: interpolating the digital signal using the optimum sampling phase and a T/N resolution to produce an interpolated signal, wherein T is a sampling period, and wherein N is an integer greater than 3; adaptively equalizing the interpolated signal to produce an equalized signal; demodulating the equalized signal to produce a demodulated signal; and performing FEC on the demodulated signal to produce a recovered signal; the portion is a header.

In yet another embodiment, the disclosure includes a method comprising: receiving an optical burst signal; determining an optimum sampling phase based on a portion of a digital signal representing the optical burst signal; and equalizing all of the digital signal using the optimum sampling phase. In some embodiments, the method further comprises further determining the optimum sampling phase by: performing an interpolation using a T/N resolution to produce waveforms with different sampling phases, wherein T is a sampling period, and wherein N is an integer greater than 3; equalizing the waveforms using pre-stored coefficients to produce equalized waveforms; determining MSEs for the equalized waveforms; determining a first equalized waveform with a smallest MSE; and determining that the optimum sampling phase is a phase of the first equalized waveform; the method of claim 16, further comprising further determining the optimum sampling phase by: performing an interpolation using a T/N resolution to produce waveforms with different phases, wherein T is a sampling period, and wherein N is an integer greater than 3; equalizing the waveforms using pre-stored coefficients to produce equalized waveforms; determining MSEs for the equalized waveforms; determining a first equalized waveform with a largest MSE; and determining that the optimum sampling phase is a phase of the first equalized waveform shifted by T/2 or −T/2; the method further comprises further determining the optimum sampling phase by: performing coarse phase optimization using a T/4 resolution, wherein T is a sampling period; performing fine phase optimization using a T/32 resolution; and determining the optimum sampling phase based on a smallest MSE; the method further comprises further determining the optimum sampling phase by: performing coarse phase optimization using a T/4 resolution, wherein T is a sampling period; performing fine phase optimization using a T/32 resolution; and determining the optimum sampling phase based on a largest MSE and a T/2 or −T/2 shift.

Any of the above embodiments may be combined with any of the other above embodiments to create a new embodiment. These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The following abbreviations and initialisms apply:
ADC: analog-to-digital conver(ter, sion)
ASIC: application-specific integrated circuit
BER: bit error ratio
CO: central office
CPU: central processing unit
dB: decibel(s)
dBm: decibel milliwatts(s)
DML: directly-modulated laser
DSP: digital signal processor
EO: electrical-to-optical
FEC: forward error correction
FFE: feed-forward equalization
FPGA: field-programmable gate array
Gb/s: gigabits per second
GS/s: gigasamples per second
km: kilometer(s)
MAC: media access controller
MSE: mean squared error
NG-PON: next-generation PON
NRZ: non-return-to-zero
ns: nanosecond(s)
ODN: optical distribution network
OE: optical-to-electrical
OLT: optical line terminal
ONT: optical network terminal
ONU: optical network unit
OOK: on-off keying
PAM-4: four-level pulse-amplitude modulation
PD: photodiode
PON: passive optical network
P2MP: point-to-multipoint
RAM: random-access memory
RN: remote node
ROM: read-only memory
RX: receiver unit
SRAM: static RAM
SSMF: standard single-mode fiber TCAM: ternary content-addressable memory
TDM: time-division multiplexing
TIA: transimpedance amplifier
TWDM: time- and wavelength-division multiplexing
TX: transmitter unit
VCO: voltage-controlled oscillator
WDM: wavelength-division multiplexing
μs: microsecond(s).

Figure 1:
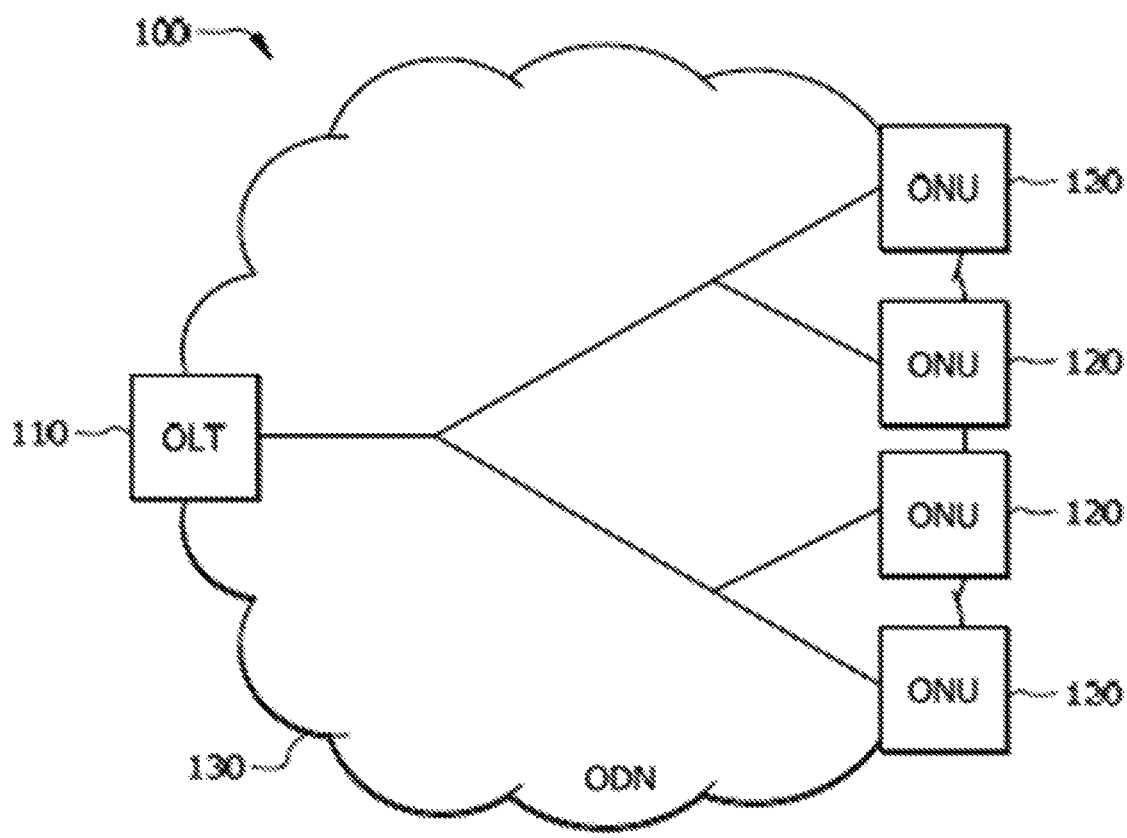
FIG. 1 is a schematic diagram of a PON.

FIG. 1 is a schematic diagram of a PON 100. The PON 100 comprises an OLT 110, a plurality of ONUs 120, and an ODN 130 that couples the OLT 110 to the ONUs 120. The PON 100 is a communications network that may not require active components to distribute data between the OLT 110 and the ONUs 120. Instead, the PON 100 may use passive optical components in the ODN 130 to distribute data between the OLT 110 and the ONUs 120.

The OLT 110 communicates with the ONUs 120 and another network. Specifically, the OLT 110 is an intermediary between the other network and the ONUs 120. For instance, the OLT 110 forwards data received from the other network to the ONUs 120 and forwards data received from the ONUs 120 to the other network. The OLT 110 comprises a transmitter and a receiver. When the other network uses a network protocol that is different from the protocol used in the PON 100, the OLT 110 comprises a converter that converts the network protocol to the PON protocol and vice versa. The OLT 110 is typically located at a central location such as a CO, but it may also be located at other suitable locations.

The ODN 130 is a data distribution system that comprises optical fiber cables, couplers, splitters, distributors, and other suitable components. The components include passive optical components that do not require power to distribute signals between the OLT 110 and the ONUs 120. Alternatively, the components include active components such as optical amplifiers that do require power. The ODN 130 extends from the OLT 110 to the ONUs 120 in a branching configuration as shown, but the ODN 130 may be configured in any other suitable P2MP configuration.

The ONUs 120 communicate with the OLT 110 and customers and act as intermediaries between the OLT 110 and the customers. For instance, the ONUs 120 forward data from the OLT 110 to the customers and forward data from the customers to the OLT 110. The ONUs 120 comprise optical transmitters that convert electrical signals into optical signals and transmit the optical signals to the OLT 110, and the ONUs 120 comprise optical receivers that receive optical signals from the OLT 110 and convert the optical signals into electrical signals. The ONUs 120 further comprise second transmitters that transmit the electrical signals to the customers and second receivers that receive electrical signals from the customers. ONUs 120 and ONTs are similar, and the terms may be used interchangeably. The ONUs 120 are typically located at distributed locations such as customer premises, but they may also be located at other suitable locations.

If the PON 100 is a TDM PON or a TWDM PON, then the ONUs 120 transmit signal bursts at different times and the OLT 110 performs burst-mode reception of those signal bursts in a common receiver. The ONUs 120 have different clock frequencies, clock phases, and channel responses, so the OLT 110 must perform channel recovery of the signal bursts in an ONU-dependent manner. Channel recovery includes both clock recovery and equalization. Approaches to continuous-mode reception, which is well developed, cannot provide fast and accurate channel recovery for burst-mode reception.

K. C. Reichmann, et al., "A Symmetric-Rate, Extended-Reach 40 Gb/s CWDM-TDMA PON with Downstream and Upstream SOA-Raman Amplification," Journal of Lightwave Technology, Vol. 30, Issue 4, Feb. 15, 2012 ("Reichmann"), which is incorporated by reference, describes one approach to burst-mode reception. Reichmann uses oversampling to lock phases for different signal bursts using ADC processing at eight times a baud rate. However, processing at eight times the baud rate consumes significant processing resources. There is therefore a need for an approach to burst-mode reception that overcomes Reichmann's shortcomings, while providing fast, accurate, and low-cost burst-mode reception.

Disclosed herein are embodiments for channel recovery in burst-mode TDM PONs. The embodiments implement two stages. A first stage, or sampling phase optimization stage, determines an optimum sampling phase using settings determined from a previous burst signal from a same ONU or using default settings. The sampling phase optimization stage implements interpolation, equalization, and phase determination based on an error. The error may be either a minimum MSE or a maximum MSE with a T/2 or −T/2 phase shift, where T is a sampling period. A second stage, or equalization stage, implements adaptive equalization using the optimum sampling phase. The embodiments may use ADC processing at two times a symbol rate for simplicity. The embodiments are fast reacting because they provide channel recovery times of less than 100 ns, which is less than channel recovery times of about 1 μs for existing burst-mode reception approaches. The embodiments also provide performance comparable to that of continuous-mode reception approaches. Because of that speed, the embodiments may apply to TDM PONs operating at 25 Gb/s and above. Furthermore, the embodiments allow for the use of low-cost, narrow-bandwidth optical components because of the channel equalization capability.

Figure 2:
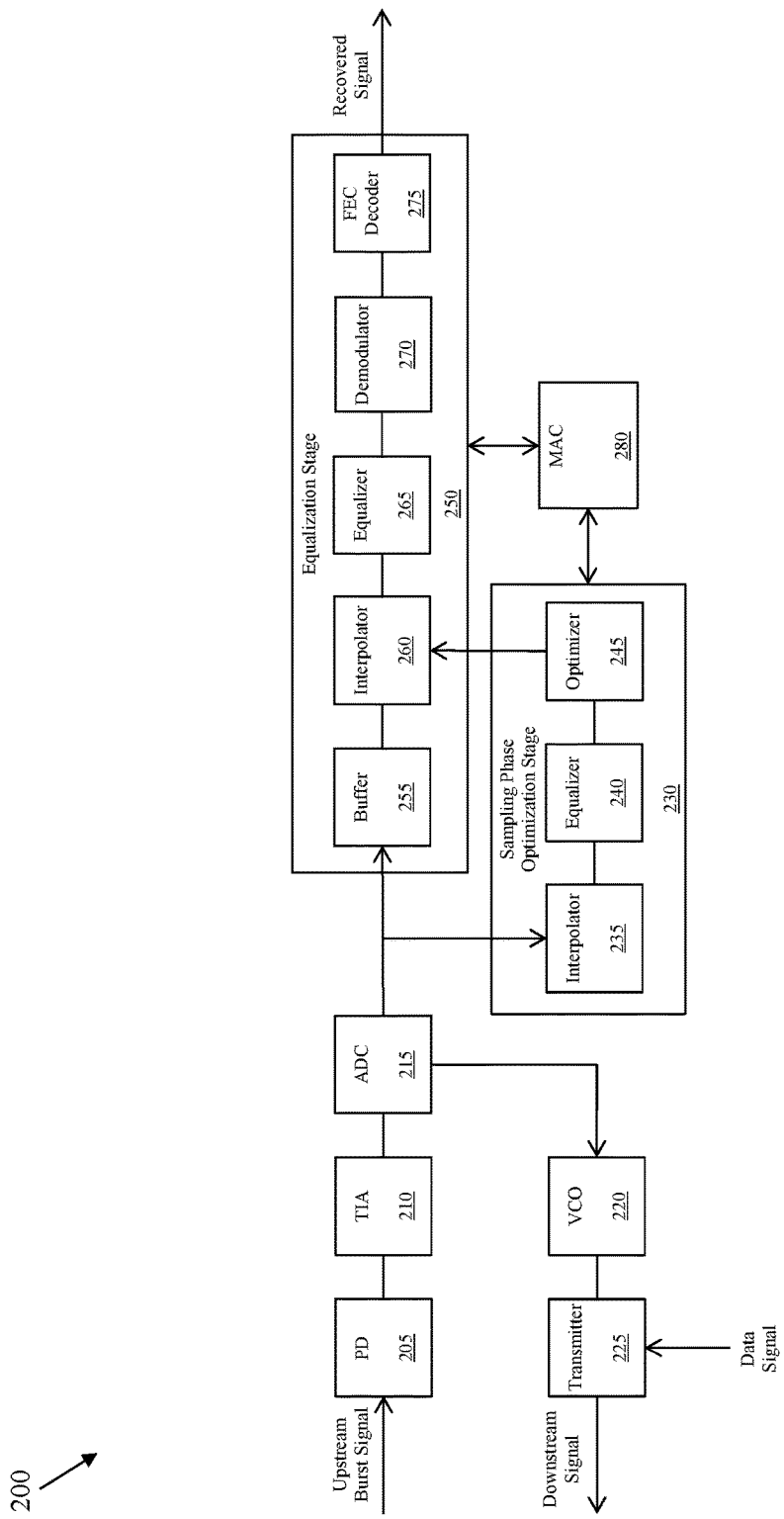
FIG. 2 is a schematic diagram of a transceiver according to an embodiment of the disclosure.

FIG. 2 is a schematic diagram of a transceiver 200 according to an embodiment of the disclosure. The OLT 110 comprises the transceiver 200, which transmits downstream signals to the ONUs 120 and receives upstream burst signals from the ONUs 120. Alternatively, the ONUs 120 or another suitable device comprises the transceiver 200. The transceiver 200 performs channel recovery in burst-mode TDM PONs or other suitable networks.

The transceiver 200 generally comprises a PD 205, a TIA 210, an ADC 215, a VCO 220, a transmitter 225, a sampling phase optimization stage 230, an equalization stage 250, and a MAC 280. The sampling phase optimization stage 230 comprises an interpolator 235, an equalizer 240, and an optimizer 245. The equalization stage 250 is coupled to an output of the sampling phase optimization stage 230 and comprises a buffer 255, an interpolator 260, an equalizer 265, a demodulator 270, and an FEC decoder 275.

In operation, the PD 205 receives an upstream burst signal from an ONU 120, which is an optical signal, and converts the upstream burst signal to an analog current signal. The TIA 210 amplifies and converts the analog current signal to an analog voltage signal. The ADC 215 samples the analog voltage signal at a relatively low sample rate, for instance at two times a baud rate. For instance, when the upstream burst signal is a 25 Gb/s NRZ signal, the sampling rate is 50 GS/s. The sampling period is T, which has an arbitrary time unit. The ADC 215 then converts the analog voltage signal to a digital signal.

For transmission in the transceiver 200, the VCO 220 samples the digital signal to synchronize a frequency between the OLT 110 and the ONU 120. The transmitter 225 receives the synchronized frequency from the VCO 220 and receives a data signal from the MAC 280 or from another processing component. Using the synchronized frequency and the data signal, the transmitter 225 transmits to the ONU 120 a downstream signal, which is an optical signal.

For reception in the transceiver 200, generally a first stage, the sampling phase optimization stage 230, determines an optimum sampling phase, and a second stage, the equalization stage 250, implements adaptive equalization using the optimum sampling phase. Specifically, in the sampling phase optimization stage 230, the interpolator 235 receives a portion of the digital signal from the ADC 215. The portion may be a beginning portion of the digital signal, for instance the first 2,000 samples or a number of samples corresponding to a header of the digital signal. The MAC 280 may provide TDM burst timing information sufficient for the interpolator 235 to determine the portion. The interpolator 235 performs interpolation on the portion using eight calculations to achieve a resolution of T/32 to produce waveforms with different sampling phases. The interpolation may be digital linear interpolation. Alternatively, the interpolator 235 uses another suitable resolution. The interpolator 235 may determine samples according to the following equation:

$$Y_{n,d} = (1-d)Y_{n-1} + dY_n, \quad (1)$$

where $Y_{n,d}$ is an interpolated sample between two samples $Y_{n-1}$ and $Y_n$, is a sample number, $(1-d)$ is a weight of $Y_{n-1}$, and d is a weight of $Y_n$. $(1-d)$ and d are inversely related to the distance from the end points to the intermediate point between sample numbers n−1 and n.

The equalizer 240 equalizes the waveforms to produce equalized waveforms. The equalizer 240 uses pre-stored coefficients from the MAC 280. The pre-stored coefficients are either default coefficients stored in the MAC 280 or coefficients determined from a previous burst signal from the ONU 120. The equalization may be FFE.

The optimizer 245 performs three steps. First, the optimizer 245 determines MSEs for each of the equalized waveforms. Second, the optimizer 245 determines that an optimum sampling phase is a phase of an equalized waveform with the smallest MSE. Alternatively, the optimizer 245 determines that an initial phase is a phase of an equalized waveform with the largest MSE and determines that an optimum sampling phase is the initial phase shifted by T/2 or −T/2. Third, the optimizer 245 passes the optimum sampling phase to the interpolator 260 in the equalization stage 250.

In the equalization stage 250, the buffer 255 buffers the digital signal from the ADC 215 for a period of time suitable for the sampling phase optimization stage 230 to determine the optimum sampling phase, then passes the digital signal to the interpolator 260. The interpolator 260 receives the digital signal from the buffer 255 and performs interpolation on all of the digital signal using the optimum sampling phase and a resolution of T/N to produce an interpolated signal. The interpolation may be digital linear interpolation. N is an integer greater than 3, for instance 32. Alternatively, the interpolator 260 uses another suitable resolution. The interpolator 260 may determine samples according to equation (1). All of the digital signal may refer to both a header of the digital signal and a payload of the digital signal.

The equalizer 265 adaptively equalizes the interpolated signal to produce an equalized signal. The equalizer 265 adapts equalizer coefficients by comparing an equalized signal waveform to a target waveform. In an initial pass, the equalizer 265 uses pre-stored coefficients from the MAC 280. The pre-stored coefficients are default coefficients stored in the MAC 280 or coefficients determined from a previous burst signal from the ONU 120. The equalization may be FFE. Upon completion of equalization, the equalizer 265 passes its final coefficients, or equalization stage coefficients, to the MAC 280, and the MAC 280 stores the equalization stage coefficients for equalization of subsequent upstream burst signals from the ONU 120.

The demodulator 270 demodulates the equalized signal to produce a demodulated signal. The FEC decoder 275 performs FEC decoding on the demodulated signal to produce a recovered signal. The FEC decoding may be hard-decision decoding or soft-decision decoding. Finally, the transceiver 200 may then perform further processing on the recovered signal.

Either between demodulation and FEC or after both demodulation and FEC, the transceiver 200 may perform synchronization using cross-correlation with a known header pattern. Using the equalization stage coefficients stored in the MAC 280, the transceiver 200 may perform channel recovery on subsequent upstream burst signals from the ONU 120. The upstream burst signal may be frequency locked with respect to a sampling frequency. T may be one-half of a modulation symbol period of the upstream burst signal. The upstream burst signal may be an OOK signal, a PAM-4 signal, or another suitable signal. In addition, the header may comprise a first type of modulation, for instance OOK, and the payload may comprise a second type of modulation, for instance PAM-4. In that case, the equalizer 265 may perform adaptive equalization for the header and non-adaptive equalization for the payload. The header of the upstream burst signal may be an extended header comprising a first potion for equalization and a second portion for typical header purposes.

FIGS. 3A-3D, 4A-4D, 5A-5D, and 6 show results from an experimental system. The experimental system comprises a 10 Gb/s burst-mode DML transmitter transmitting a 25 Gb/s OOK signal over a 20 km SSMF. The experimental system also comprises a transceiver similar to the transceiver 200 and receiving and performing channel recovery on the signal. FIGS. 3A-3D, 4A-4D, 5A-5D show graphs that are similar, but represent first measurements, second measurements, and third measurements, respectively.

Figure 3A:
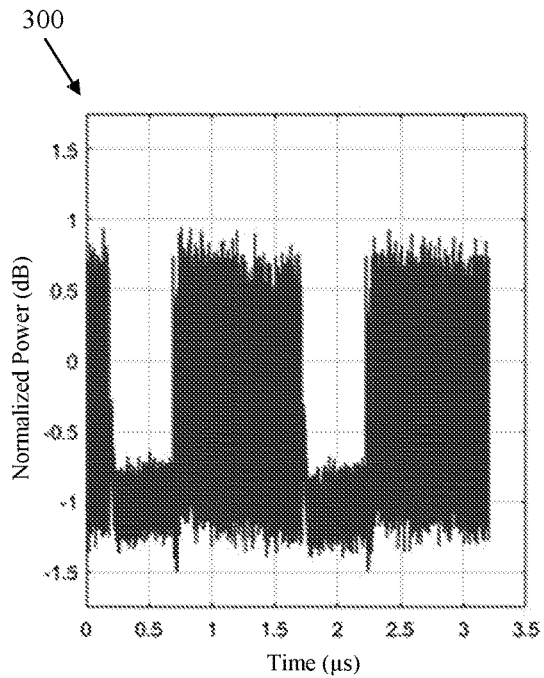
FIG. 3A is a graph of an upstream burst signal.

FIG. 3A is a graph 300 of an upstream burst signal. The x-axis represents time in μs, and the y-axis represents normalized power in dB. The graph 300 shows that the upstream burst signal starts at about 0.64 μs.

Figure 3B:
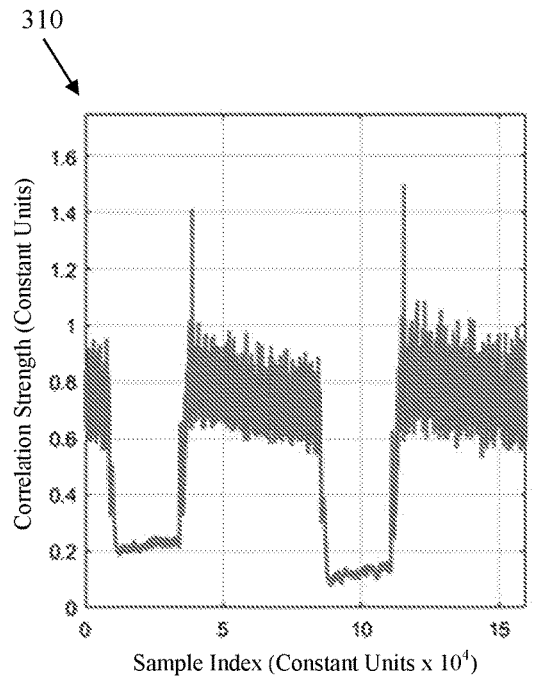
FIG. 3B is a graph of a correlation between an equalized upstream burst signal and a known header pattern.

FIG. 3B is a graph 310 of a correlation between an equalized upstream burst signal and a known header pattern. The x-axis represents a sample index in constant units times $10^4$, and the y-axis represents a correlation strength in constant units. The sampled upstream burst signal is a sampled version of the upstream burst signal in the graph 300. The graph 310 shows that a header of the sampled upstream burst signal, which is the sharp peak at about $4 \times 10^4$, has a stronger correlation strength than a payload of the sampled upstream burst signal, which is the portion from about $4 \times 10^4$ to $8 \times 10^4$.

Figure 3C:
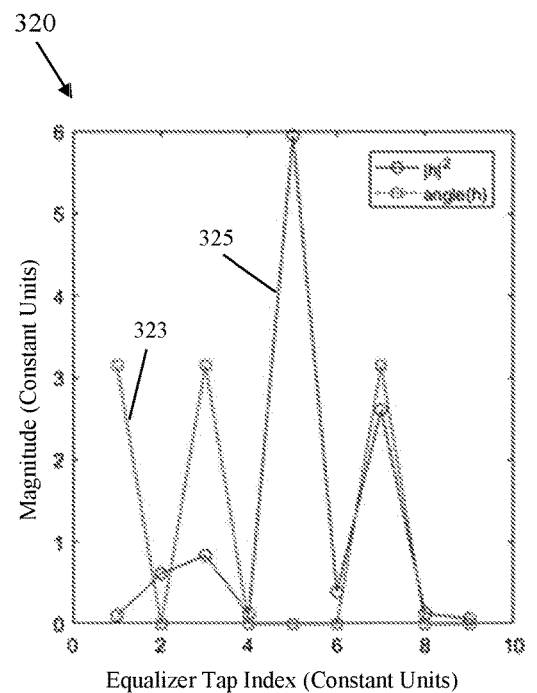
FIG. 3C is a graph of equalizer coefficients.

FIG. 3C is a graph 320 of equalizer coefficients. The x-axis represents an equalizer tap index in constant units, and the y-axis represents a magnitude in constant units. The graphs 320 comprises a first curve 323 marked with squares and corresponding to phase angles of equalizer coefficients for the equalization stage 250 and comprises a second curve 325 marked with circles and corresponding to squares of absolute values of equalizer coefficients for the sampling phase optimization stage 230. The graph 320 shows that the equalizer coefficients are well converged.

Figure 3D:
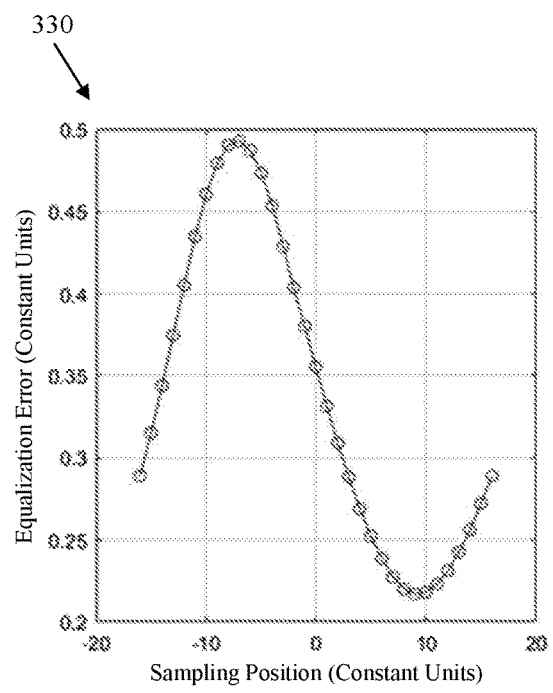
FIG. 3D is a graph of an equalization error.

FIG. 3D is a graph 330 of an equalization error. The x-axis represents a sampling position in constant units, and the y-axis represents an equalization error in constant units. The graph 330 is sinusoidal with a period equivalent to T. For that reason, a resolution of at least T/4 is needed to reliably determine an optimal sampling phase. The graph 330 shows that an optimum sampling phase is at sampling position 9, which is where the equalization error is at its lowest level of about 0.22.

Figure 4A:
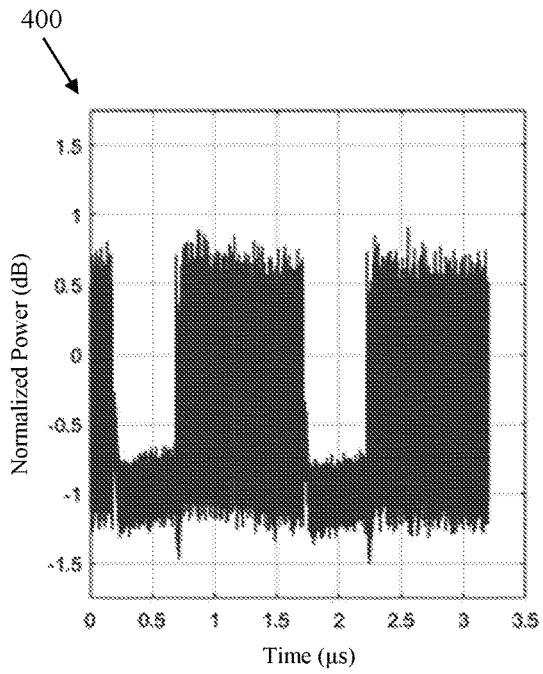
FIG. 4A is another graph of an upstream burst signal.
Figure 4B:
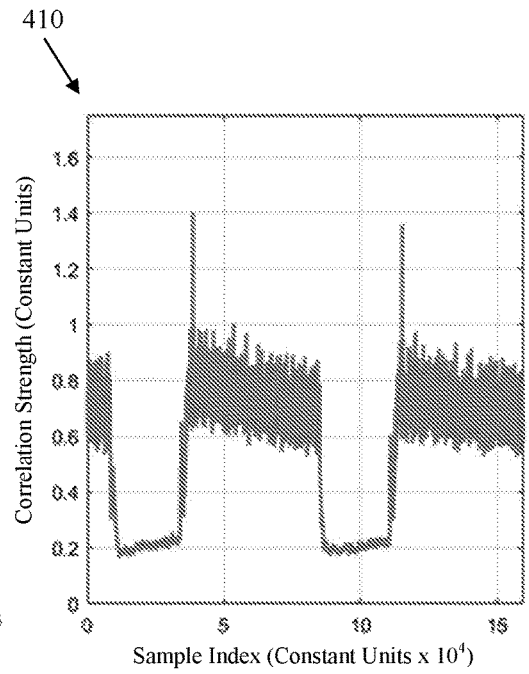
FIG. 4B is another graph of a correlation between an equalized upstream burst signal and a known header pattern.
Figure 4C:
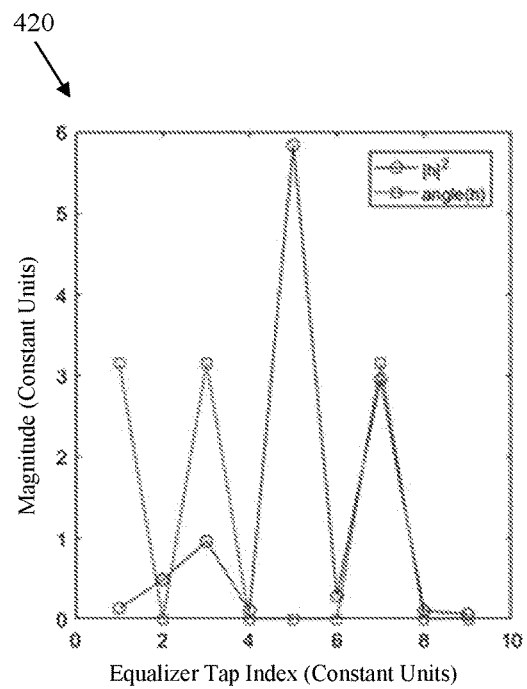
FIG. 4C is another graph of equalizer coefficients.
Figure 4D:
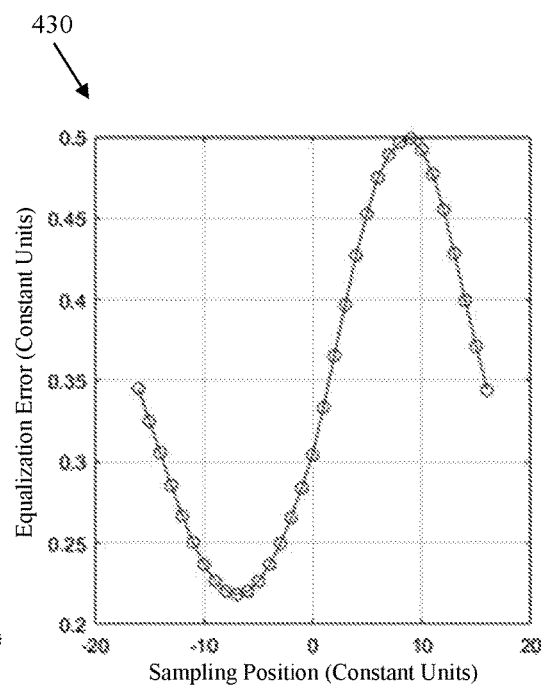
FIG. 4D is another graph of an equalization error.

FIGS. 4A-4D are similar to FIGS. 3A-3D, respectively. FIG. 4A is another graph 400 of an upstream burst signal. FIG. 4B is another graph 410 of a correlation between an equalized upstream burst signal and a known header pattern. FIG. 4C is another graph 420 of equalizer coefficients. FIG. 4D is another graph 430 of an equalization error. The graph 430 shows that an optimum sampling phase is at sampling position −7, which is where the equalization error is at its lowest level of about 0.22.

Figure 5A:
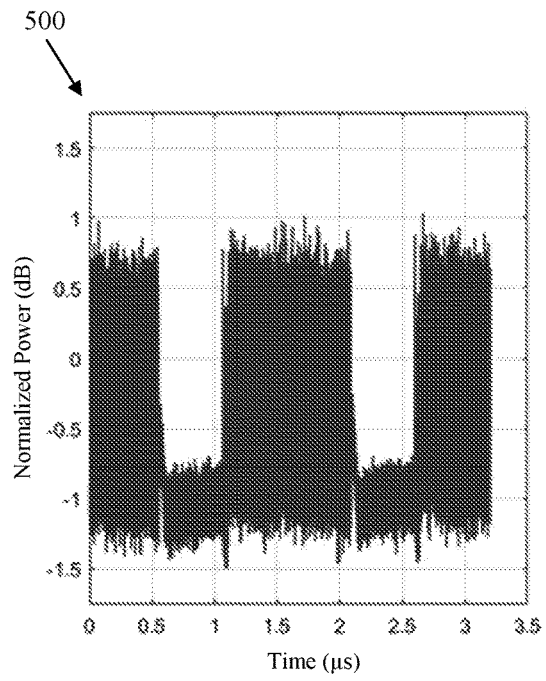
FIG. 5A is yet another graph of an upstream burst signal.
Figure 5B:
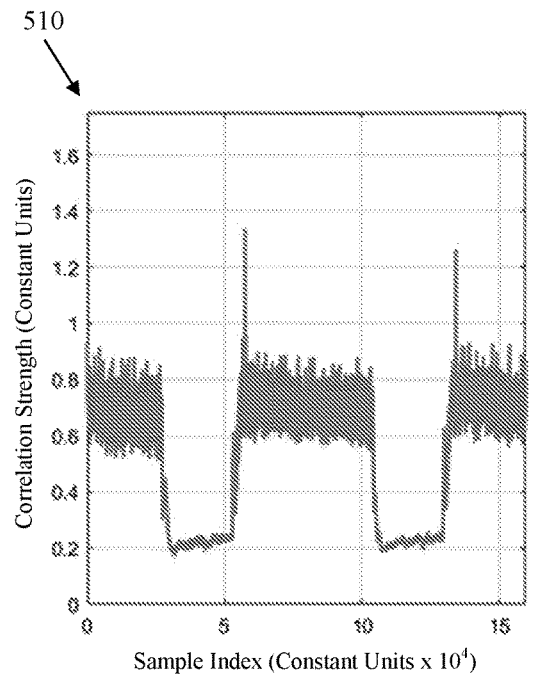
FIG. 5B is yet another graph of a correlation between an equalized upstream burst signal and a known header pattern.
Figure 5C:
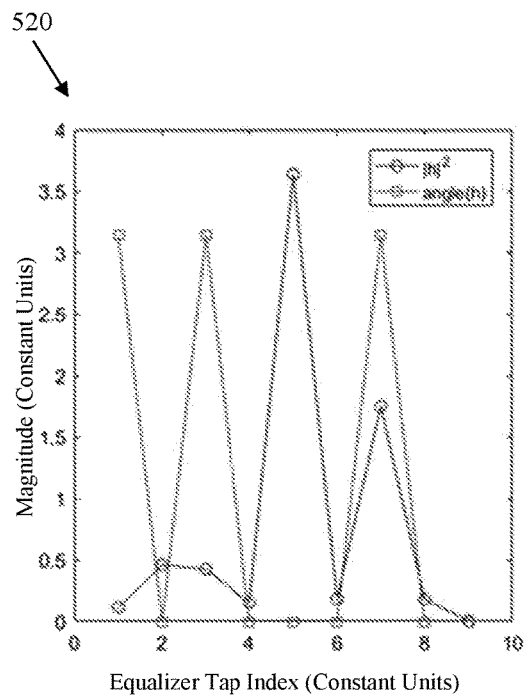
FIG. 5C is yet another graph of equalizer coefficients.
Figure 5D:
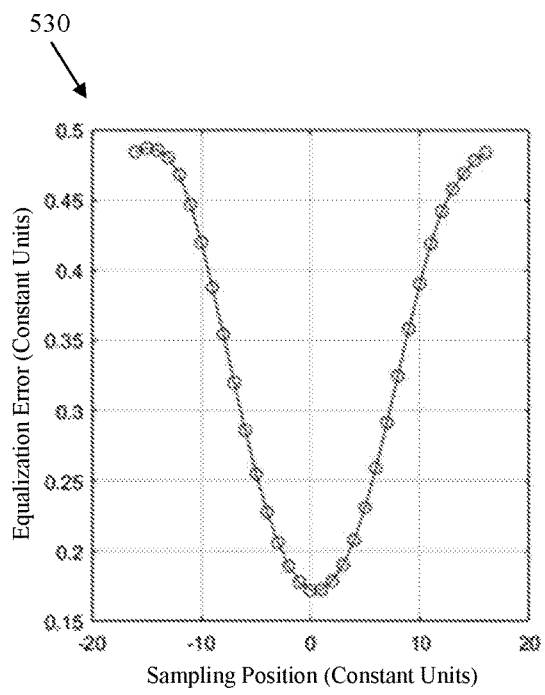
FIG. 5D is yet another graph of an equalization error.

FIGS. 5A-5D are similar to FIGS. 3A-3D, respectively. FIG. 5A is yet another graph 500 of an upstream burst signal. FIG. 5B is yet another graph 510 of a correlation between an equalized upstream burst signal and a known header pattern. FIG. 5C is yet another graph 520 of equalizer coefficients. FIG. 5D is yet another graph 530 of an equalization error. The graph 430 shows that an optimum sampling phase is at sampling position 0, which is where the equalization error is at its lowest level of about 0.22.

Figure 6:
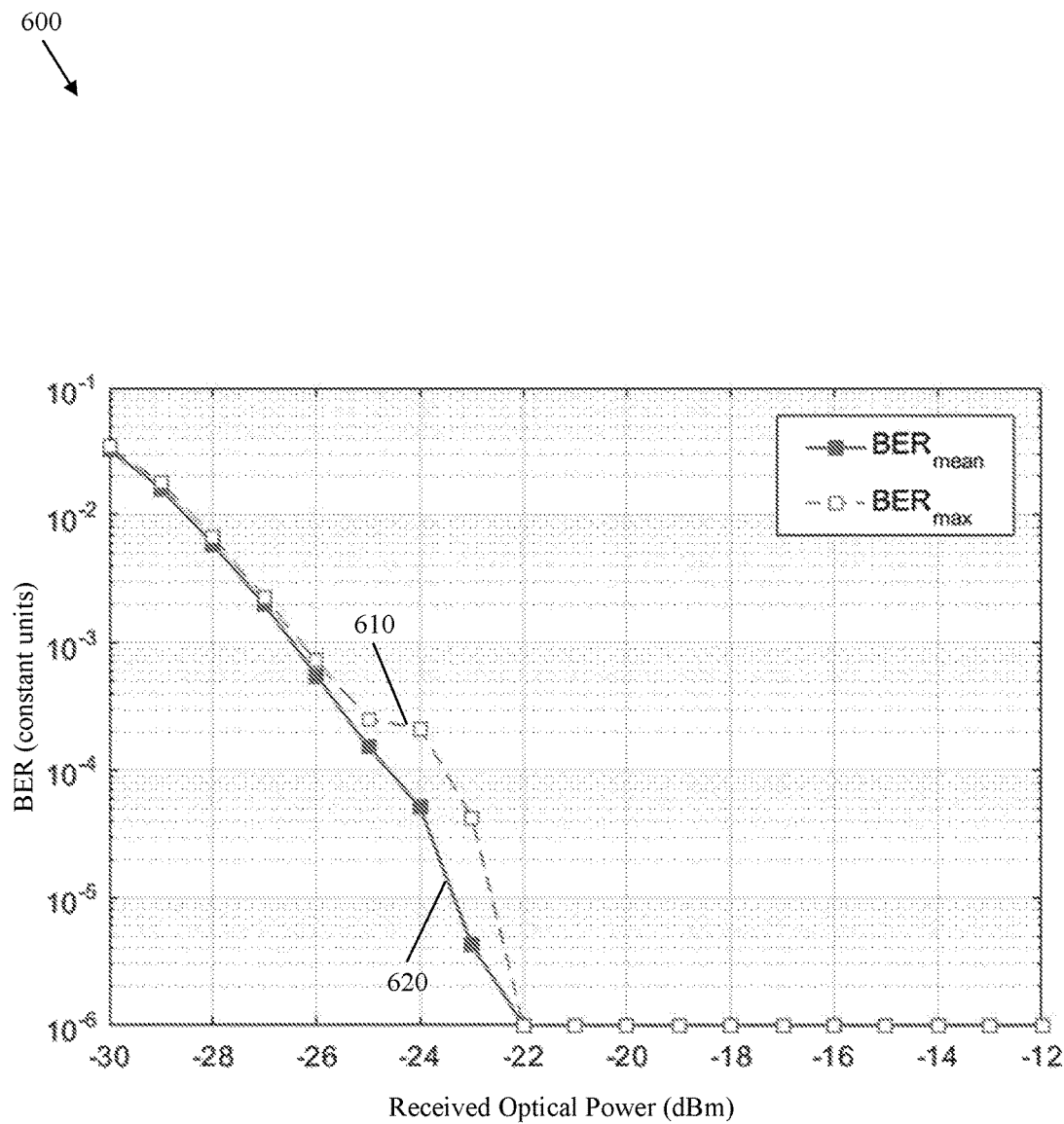
FIG. 6 is a graph of BERs.

FIG. 6 is a graph 600 of BERs. The x-axis represents a received optical power in dBm, and the y-axis represents a BER in constant units. The graph 600 comprises a first curve 610 marked with outlined squares and corresponding to a maximum BER and comprises a second curve 620 marked with filled-in squares and corresponding to a mean BER. The graph 600 shows that the maximum BER closely tracks the mean BER and transceiver 200 provides good receiver sensitivity.

Figure 7:
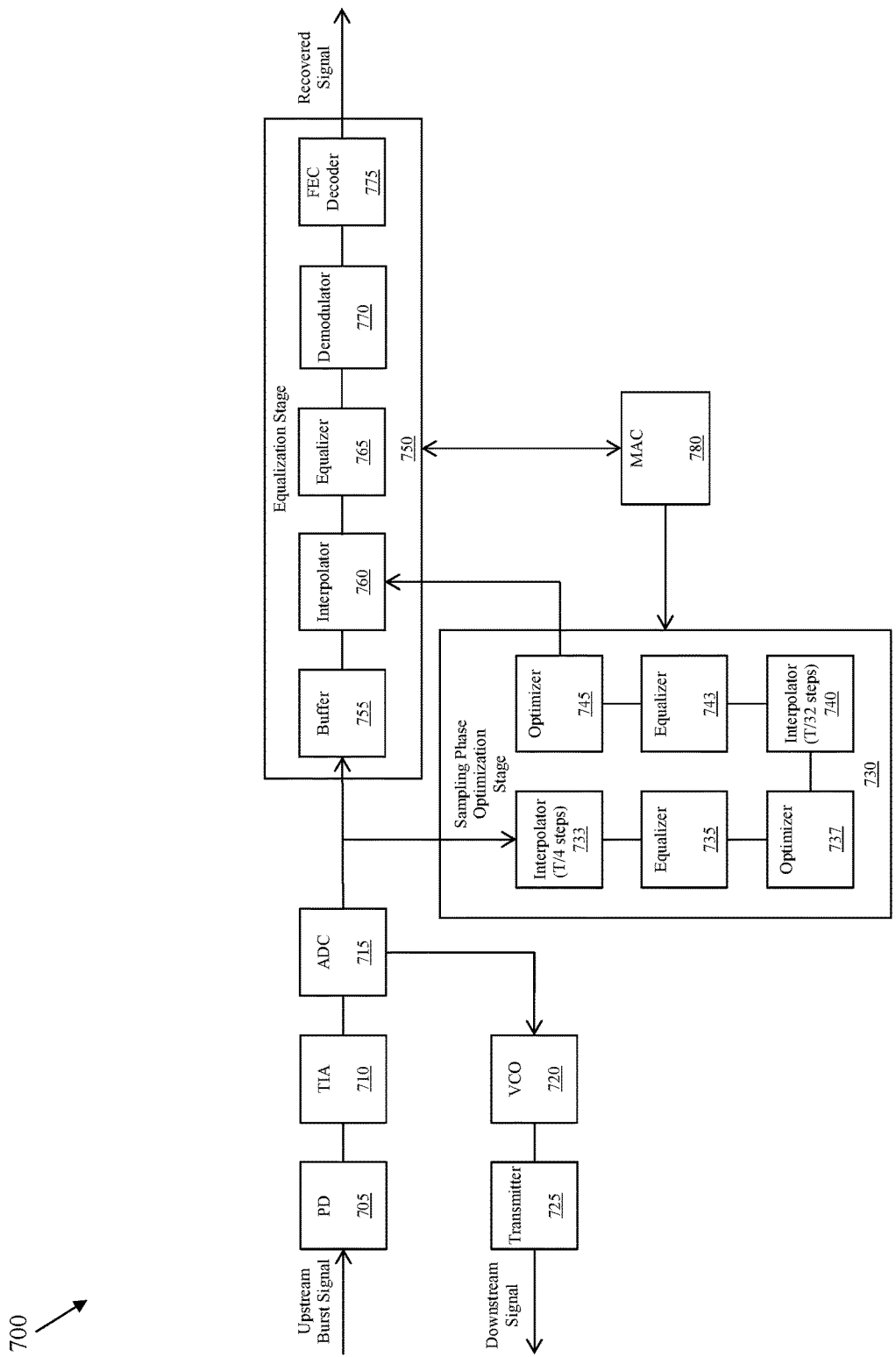
FIG. 7 is a schematic diagram of a transceiver according to another embodiment of the disclosure.

FIG. 7 is a schematic diagram of a transceiver 700 according to another embodiment of the disclosure. The transceiver 700 is similar to the transceiver 200. Like the transceiver 200, the transceiver 700 generally comprises a PD 705, a TIA 710, an ADC 715, a VCO 720, a transmitter 725, a sampling phase optimization stage 730, an equalization stage 750, and a MAC 780. Also like the transceiver 200, the equalization stage 750 comprises a buffer 755, an interpolator 760, an equalizer 765, a demodulator 770, and an FEC decoder 775. However, unlike the transceiver 200, which comprises a single interpolator 235, equalizer 240, and optimizer 245 in the sampling phase optimization stage 230, the transceiver 700 comprises two interpolators 733, 740; equalizers 735, 743; and optimizers 737, 745 in the sampling phase optimization stage 730.

The interpolator 733, equalizer 735, and optimizer 737 perform coarse phase optimization, and the interpolator 740, equalizer 743, and optimizer 745 perform fine phase optimization. Specifically, the interpolator 733 performs interpolation on the portion using a resolution of T/4 to produce waveforms with different phases. The interpolator 740 then performs digital linear interpolation on the portion using a resolution of T/32 to produce waveforms with different phases. The interpolation may be digital linear interpolation. Thus, in this context, coarse phase optimization and fine phase optimization indicate a relative relationship to each other so that fine phase optimization occurs at a finer, or smaller, resolution than coarse phase optimization. Alternatively, the interpolators 733, 740 use other suitable resolutions. Compared to the transceiver 200, the transceiver 700 performs phase optimization marginally slower, but does so by using less processing power at any given time.

Figure 8:
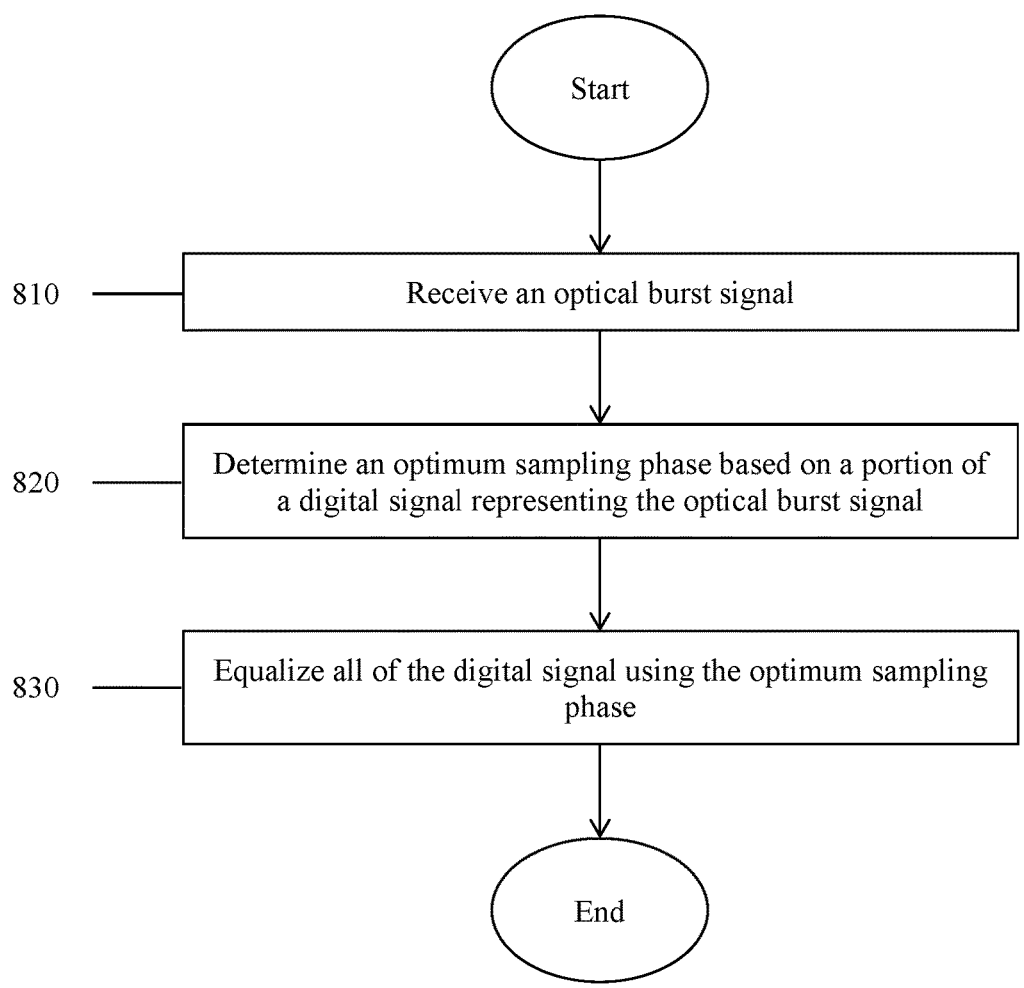
FIG. 8 is a flowchart illustrating a method of channel recovery according to an embodiment of the disclosure.

FIG. 8 is a flowchart illustrating a method 800 of channel recovery according to an embodiment of the disclosure. The transceivers 200, 700 perform the method 800. At step 810, an optical burst signal is received. For instance, the PDs 205, 705 receive an upstream burst signal. At step 820, an optimum sampling phase is determined based on a portion of a digital signal representing the optical burst signal. For instance, the sampling phase optimization stages 230, 730 determine the optimum sampling phase based on a header of the upstream burst signal. The sampling phase optimization stages 230, 730 may do so using either a smallest MSE or a largest MSE and a T/2 or −T/2 phase shift. The sampling phase optimization stages 230, 730 may do so also using either a single interpolation, equalization, and optimization or both a coarse and fine interpolation, equalization, and optimization. Finally, at step 830, all of the digital signal is equalized using the optimum sampling phase. For instance, the equalization stages 250, 750 perform the equalization using adaptive equalization, non-adaptive equalization, or a combination of both adaptive equalization for the header and non-adaptive equalization for a payload of the upstream burst signal.

Figure 9:
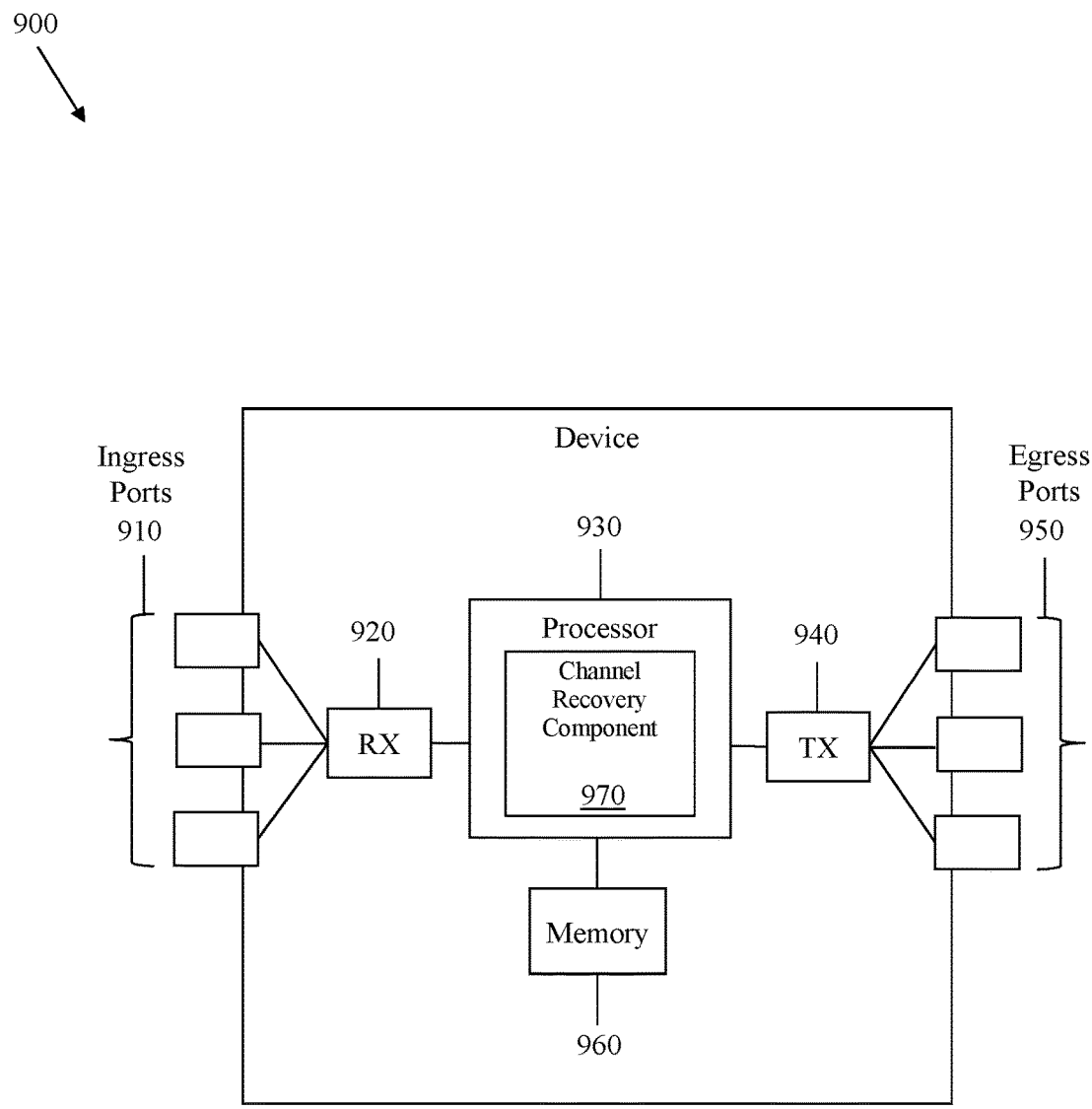
FIG. 9 is a schematic diagram of a device according to an embodiment of the disclosure.

FIG. 9 is a schematic diagram of a device 900 according to an embodiment of the disclosure. The device 900 may implement the disclosed embodiments, for instance the transceivers 200, 700 or portions of the transceivers 200, 700. The device 900 comprises ingress ports 910 and an RX 920 for receiving data; a processor, logic unit, or CPU 930 to process the data; a TX 940 and egress ports 950 for transmitting the data; and a memory 960 for storing the data. The device 900 may also comprise OE components and EO components coupled to the ingress ports 910, the RX 920, the TX 940, and the egress ports 950 for ingress or egress of optical or electrical signals.

The processor 930 is any suitable combination of hardware, middleware, firmware, or software. The processor 930 comprises any combination of one or more CPU chips, cores, FPGAs, ASICs, or DSPs. The processor 930 communicates with the ingress ports 910, RX 920, TX 940, egress ports 950, and memory 960. The processor 930 comprises a channel recovery component 970, which implements the disclosed embodiments. The inclusion of the channel recovery component 970 therefore provides a substantial improvement to the functionality of the device 900 and effects a transformation of the device 900 to a different state. Alternatively, the memory 960 stores the channel recovery component 970 as instructions, and the processor 930 executes those instructions.

The memory 960 comprises one or more disks, tape drives, or solid-state drives. The device 900 may use the memory 960 as an over-flow data storage device to store programs when the device 900 selects those programs for execution and to store instructions and data that the device 900 reads during execution of those programs. The memory 960 may be volatile or non-volatile and may be any combination of ROM, RAM, TCAM, or SRAM.

In an example embodiment, a transceiver comprises a sampling phase optimization element comprising a first interpolator element, a first equalizer element coupled to the first interpolator element, a first optimizer element coupled to the first equalizer element, and an output element; and an equalization stage element coupled to the output element and comprising a buffer element, a second interpolator element coupled to the buffer element, and a second equalizer element coupled to the second interpolator element.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A transceiver comprising:
    a sampling phase optimization stage comprising:
        a first interpolator;
        a first equalizer coupled to the first interpolator;
        a first optimizer coupled to the first equalizer; and
        an output; and
    an equalization stage coupled to the output and comprising:
        a buffer;
        a second interpolator coupled to the buffer; and
        a second equalizer coupled to the second interpolator.

2. The transceiver of claim 1, wherein the equalization stage further comprises:
    a demodulator coupled to the second equalizer; and
    a forward error correction (FEC) decoder coupled to the demodulator.

3. The transceiver of claim 1, further comprising a media access controller (MAC) coupled to the sampling phase optimization stage and the equalization stage.

4. The transceiver of claim 1, further comprising:
    a photodiode (PD);
    a transimpedance amplifier (TIA) coupled to the PD; and
    an analog-to-digital converter (ADC) coupled to the TIA, the sampling phase optimization stage, and the equalization stage.

5. The transceiver of claim 4, further comprising:
    a voltage-controlled oscillator (VCO) coupled to the ADC; and
    a transmitter coupled to the VCO.

6. The transceiver of claim 1, wherein the sampling phase optimization stage further comprises:
    a third interpolator coupled to the first optimizer;
    a third equalizer coupled to the third interpolator; and
    a third optimizer coupled to the third equalizer and the output.

7. The transceiver of claim 1, wherein the transceiver is comprised in an optical line terminal (OLT), and wherein the OLT is part of a passive optical network (PON).

8. The transceiver of claim 7, wherein the transceiver is configured to:
    transmit downstream signals to optical network units (ONUs), wherein the ONUs are part of the PON; and
    receive upstream burst signals from the ONUs.

9. The transceiver of claim 1, wherein the transceiver is comprised in an optical network unit (ONU), and wherein the ONU is part of a passive optical network (PON).

10. The transceiver of claim 1, wherein the sampling phase optimization stage is configured to determine an optimum sampling phase based on a portion of a digital signal representing an optical burst signal.

11. The transceiver of claim 10, wherein the portion is a header.

12. The transceiver of claim 10, wherein the equalization stage is configured to equalize all of the digital signal using the optimum sampling phase.

13. The transceiver of claim 1, wherein the first interpolator is configured to interpolate a portion of a digital signal representing an optical burst signal using a T/N resolution to produce waveforms with different phases, wherein T is a sampling period, and wherein N is an integer greater than 3.

14. The transceiver of claim 13, wherein the first equalizer is configured to equalize the waveforms using pre-stored coefficients to produce equalized waveforms.

15. The transceiver of claim 14, wherein the first optimizer is configured to:
    determine mean squared errors (MSEs) for the equalized waveforms;
    determine a first equalized waveform with a smallest MSE;
    determine that an optimum sampling phase is a phase of the first equalized waveform; and
    pass the optimum sampling phase to the second interpolator.

16. The transceiver of claim 15, wherein the buffer is configured to buffer the digital signal while the sampling phase optimization stage determines the optimum sampling phase.

17. The transceiver of claim 16, wherein the second interpolator is configured to interpolate the digital signal using the optimum sampling phase and a T/N resolution to produce an interpolated signal.

18. The transceiver of claim 17, wherein the second equalizer is configured to adaptively equalize the interpolated signal to produce an equalized signal.

19. The transceiver of claim 18, further comprising a demodulator coupled to the second equalizer and configured to demodulate the equalized signal to produce a demodulated signal.

20. The transceiver of claim 19, further comprising a forward error correction (FEC) decoder coupled to the demodulator and configured to perform FEC on the demodulated signal to produce a recovered signal.

* * * * *